(12) United States Patent
Kia et al.

(10) Patent No.: US 8,668,247 B2
(45) Date of Patent: Mar. 11, 2014

(54) MAGNESIUM-COMPOSITE STRUCTURES WITH ENHANCED DESIGN

(75) Inventors: Hamid G. Kia, Bloomfield Hills, MI (US); Aihua A. Luo, Troy, MI (US); John N. Owens, Franklin, MI (US); James F. Quinn, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/453,204

(22) Filed: Apr. 23, 2012

(65) Prior Publication Data

US 2013/0278016 A1    Oct. 24, 2013

(51) Int. Cl.
    *B60N 99/00*    (2006.01)
(52) U.S. Cl.
    USPC ........................ 296/187.03; 293/132; 188/371
(58) Field of Classification Search
    USPC ................ 293/132, 133; 296/187.03, 187.05, 296/187.08–187.13; 188/371, 376, 377
    See application file for complete search history.

(56) References Cited

U.S. PATENT DOCUMENTS

| | | | |
|---|---|---|---|
| 3,412,628 A * | 11/1968 | De Gain ........................... | 74/492 |
| 3,785,290 A * | 1/1974 | Castor et al. .................... | 102/388 |
| 3,884,037 A | 5/1975 | Barber et al. | |
| 4,023,652 A * | 5/1977 | Torke ............... | 188/377 |
| 4,050,326 A * | 9/1977 | Kopf ............................... | 74/492 |
| 4,131,701 A | 12/1978 | VanAuken | |
| 4,173,670 A | 11/1979 | VanAuken | |
| 4,330,122 A * | 5/1982 | Sheinberg et al. ............ | 473/109 |
| 5,033,593 A * | 7/1991 | Kazuhito ....................... | 188/377 |
| 5,419,416 A * | 5/1995 | Miyashita et al. ............. | 188/371 |
| 5,634,860 A * | 6/1997 | McIntosh et al. .............. | 473/318 |
| 5,914,163 A | 6/1999 | Browne | |
| 6,523,873 B1 * | 2/2003 | Summe et al. ................. | 293/133 |
| 6,830,286 B2 * | 12/2004 | Bechtold et al. .......... | 296/187.03 |
| 6,994,350 B2 * | 2/2006 | Krajewski et al. ........ | 296/187.03 |
| 7,255,378 B1 * | 8/2007 | Baccouche et al. ............ | 293/146 |
| 7,389,860 B2 * | 6/2008 | Abu-Odeh et al. ............ | 188/377 |

(Continued)

FOREIGN PATENT DOCUMENTS

| | | |
|---|---|---|
| CN | 102410438 A | 4/2012 |
| DE | 102011113554 A1 | 6/2012 |
| EP | 0235777 A2 | 9/1987 |

OTHER PUBLICATIONS

Gaines, L., et al., "Potential Automotive Uses of Wrought Magnesium Alloys," Automotive Technology Development Conference, Detroit, Michigan, Argonne National Laboratory (Oct. 28-Nov. 1, 1996).

(Continued)

*Primary Examiner* — Lori Lyjak
(74) *Attorney, Agent, or Firm* — Harness, Dickey & Pierce, P.L.C.

(57) ABSTRACT

A segmented tube formed of a magnesium-based alloy and wrapped or jacketed with a reinforcement to apply a restraining force on the external surface of the tube for resisting fragmentation of the tube by the compressive force applied to the end of the tube serves as a structural member for receiving a compressive stress applied to an end of the tube and acting along the axis of the tube toward the opposing end of the tube. The magnesium alloy tube is comparatively light, and the segmented and wrapped or jacketed tube has an increased capacity to absorb compressive forces. The tubes are useful as components of automotive vehicles.

20 Claims, 6 Drawing Sheets

(56) References Cited

U.S. PATENT DOCUMENTS

| | | | |
|---|---|---|---|
| 7,404,474 B2* | 7/2008 | Yamaki et al. | 188/376 |
| 7,963,378 B2* | 6/2011 | Glance et al. | 188/377 |
| 8,210,583 B2* | 7/2012 | Wavde et al. | 293/132 |
| 8,398,133 B2* | 3/2013 | Ghannam et al. | 293/133 |
| 2003/0090127 A1* | 5/2003 | Saeki | 296/188 |
| 2004/0140169 A1* | 7/2004 | Shimoda | 188/377 |
| 2004/0189049 A1* | 9/2004 | Krajewski et al. | 296/187.03 |
| 2005/0196570 A1 | 9/2005 | Lindsay | |
| 2007/0181393 A1* | 8/2007 | Suzuki | 188/377 |
| 2012/0068497 A1 | 3/2012 | Kia et al. | |
| 2012/0221097 A1* | 8/2012 | Schmid et al. | 623/1.16 |

OTHER PUBLICATIONS

Mukai, Toshiji, et al., "Ductility enhancement in AZ31 magnesium alloy by controlling its grain structure," Scripta Materialia, vol. 45, pp. 89-94 (2001).

Watarai, Hisao, "Trend of Research and Development for Magnesium Alloys—Reducing the Weight of Structural Materials in Motor Vehicles," Quarterly Review No. 18, Science & Technology Trends, pp. 84-97 (Jan. 2006) (original Japanese version published Aug. 2005).

Westengen, H., "Magnesium alloys for structural applications," Journal de Physique IV, vol. 3, pp. 491-501 (Nov. 1993).

Non-Final Office Action mailed Nov. 16, 2012 in U.S. Appl. No. 12/886,632.

Response to Non-Final Office Action mailed Nov. 16, 2012 in U.S. Appl. No. 12/886,632 (published as 2012/0068497), as filed on Feb. 13, 2013.

Final Office Action mailed Jun. 5, 2013 in U.S. Appl. No. 12/886,632 (published as 2012/0068497).

Applicant-Initiated Interview Summary mailed Jul. 18, 2013 in in U.S. Appl. No. 12/886,632 (published as 2012/0068497).

Response to Final Office Action mailed Jun. 5, 2013 in U.S. Appl. No. 12/886,632 (published as 2012/0068497), as filed on Jul. 25, 2013.

Advisory Action mailed Aug. 29, 2013 in U.S. Appl. No. 12/886,632 (published as 2012/0068497).

* cited by examiner

MAGNESIUM-COMPOSITE STRUCTURES WITH ENHANCED DESIGN

FIELD OF THE INVENTION

The invention concerns walled, elongated, magnesium-based alloy structural components and their properties, particularly in absorbing compressive forces.

INTRODUCTION TO THE DISCLOSURE

This section provides background information related to this disclosure but which may or may not be prior art.

There is a continual need to reduce the mass of vehicle components for improved fuel efficiency. One avenue toward mass reduction is to adapt magnesium alloys for applications as reduced weight components in vehicle applications.

SUMMARY OF THE DISCLOSURE

A walled, elongated, optionally interiorly reinforced, magnesium alloy article or component is grooved or segmented along its length and wrapped or jacketed, generally from end to end, with a reinforcement. The magnesium alloy article or component may have a single groove or multiple spaced-apart grooves or may be composed of two or more adjacent or joined segments. The magnesium alloy article or component is wrapped or jacketed around its external surface, generally for its whole length from end to end, with a reinforcement such as thermoplastic polymer film, metal wire or mesh, or a fiber reinforcement, which may be in the form of tows, rovings, braids, tapes, mats, or fabrics that may be woven, knit, braided, or stitched. The fiber reinforcement may be covered or impregnated before or after being wrapped on the tube with a thermosettable resin that is cured after wrapping or a thermoplastic polymer that is heated above its softening or melting point to fuse the reinforcement around the magnesium alloy tube. Metal and carbon fiber reinforcements may be coated or separated from the magnesium alloy surface by a coating or plastic sleeve on the tube.

The magnesium alloy tube is designed to be subjected to a compressive force applied against one end of the tube and transmitted toward the other end. When the compressive force causes a break in the tube, the break propagates only so far as a groove or an interface between segments. The covering reinforcement applies a restraining force on the external surface of the magnesium alloy article or component for resisting separation of fragments of the structure when an applied compressive force is sufficient to fragment one or more segments of the magnesium alloy article or component. Continuing compressive force causes the fragments of the broken segment and its surrounding reinforcement to finally break from the tube at a groove, if the tube is grooved, or at a junction of the broken segment and an adjacent segment to expose an edge of the next succeeding segment to the continuing compressive force. When compressive force is applied to one end of the walled magnesium alloy article or component, the grooves or section junctions enable broken segments to break from the article or component to expose an upper edge of a next succeeding segment to the compressive force. In this way, the grooved or segmented tube provides peaks of compressive stress as the tube absorbs a compressive force until a segment breaks and then breaks off, then again absorbs compressive force against an edge of a succeeding segment.

When the magnesium alloy article or component has one or more grooves it is a unitary piece with segments that are set apart by the groove or grooves. For ease of description, a portion of a grooved magnesium alloy article or component between an end and a first groove from that end or between a groove and a next successive groove will be referred to as a "segment," and one of a plurality of sections that are adjacent or have been joined together to form the elongated, walled magnesium alloy article or component will also be referred to as a "segment."

The elongated, walled, optionally interiorly reinforced, magnesium alloy article or component may have a regular or irregular cross-section; for ease of description, the elongated, walled, optionally interiorly reinforced, magnesium alloy article or component will be referred to as a "tube" regardless of its cross-section. The elongated, walled, optionally interiorly reinforced, magnesium alloy tube may or may not have a uniform cross-section, diameter, or width along its length; for example, it may have a walled perimeter of a frustum. The elongated, walled magnesium alloy tube has two ends and has (a) at least one groove along its perimeter (which is a circumference if the perimeter is circular) in between the ends or (b) is divided into a plurality of adjacent or adhesively or mechanically joined segments along its length, wherein the magnesium alloy tube is wrapped or jacketed with a reinforcement. When the elongated, walled magnesium alloy tube has at least one groove, the groove may be in a plane about parallel to a plane of a first end, could be in a plane at another angle relative to the plane of the first end, or could be irregular so that the groove lies in no single plane; for example, the groove could be saddle-shaped, sinusoidal, or saw-toothed. If the tube has more than one groove, the grooves may be shaped the same or differently. Further, as used in this description a "walled" magnesium alloy tube has a magnesium alloy perimeter wall and is not solid magnesium alloy. Thus, the walled magnesium alloy tube may be empty, may be filled with another material such as a foam, or may include one or more interior reinforcing members of the magnesium alloy itself, which may be unitary with the perimeter wall, but which do not fill the tube, or one or more interior reinforcing members of another material.

The magnesium alloy tube may be extruded or may be formed by other methods, such as by casting or by shaping from sheet metal precursor shapes. The magnesium alloy tube may have one or more interior reinforcing members, such as interior ribs or struts, to provide resistance to the tube deforming or collapsing inwardly when subjected to an axial compressive load. Such interior reinforcing members will typically be straight, extend through the axis of the tube, and with opposing ends fixed to the interior surface of the tube. When the tube has the described grooves, the interior reinforcing members may extend the full length of the tube or be formed in selected longitudinal regions of the tube. When the tube is made of joined or adjacent segments, the interior reinforcing members may extend along part or all of the interior region of all or less than all of the segments. The tube may also have an interior reinforcing member or members of a material different from the tube that is inserted into the tube or into each segment before they are assembled to form the tube.

The magnesium alloy tube is useful as a structural member for receiving a compressive force, used either singly or as a pair or greater number of magnesium alloy tube structural members. In an embodiment, a plurality of the magnesium alloy tubes are used in an energy-absorbing application while supporting a front-end or rear-end vehicle bumper, as a bumper beam, or any other structural members that are generally parallel to crash loading, such as frame rails, cross members, crush cans, instrument panel beams, and so on. In various embodiments, the tube may have circular, elliptical, square, rectangular or other polygonal cross-sectional outer perimeter shapes with uniform or non-uniform wall thicknesses. Other embodiments of tubes may have truncated geometrical or frustum shapes with a broad range of cross-sections, including conical and pyramidal shapes. A conical tube for use as a compression member may have suitably steep sides for absorbing the compressive force along the vertical axis of the tube with uniform or non-uniform wall thicknesses. In one embodiment, a bumper is attached to, and carried by, the front-facing ends of a pair of spaced and horizontally-aligned, equal-length tubes, while the rear ends of the tubes are fixed to a vehicle body structure. A suitable bumper member would be positioned on the tubes to receive, for example, a relatively low speed impact that would otherwise damage adjacent body portions of the vehicle. In such tube-bumper arrangements, the tubular members are designed to receive a sudden compressive load along the axis of the tube (with possible deformation or breaking of one or more segments) and to absorb much of the energy of such an impact. The tube may experience some deformation or breakage under the axial compressive load, but it is intended that it serve to avoid or limit damage to adjacent vehicle panels or other structures. When an unwrapped and unsegmented magnesium alloy tube is subjected to such compressive loads, the magnesium alloy tube tends to fragment pervasively, shattering the tube with some limited deformation, rather than absorbing the load. This kind of shattering of the tube was observed even when round magnesium alloy tubes were extruded with integral, interior, radial strengthening ribs. As disclosed in Hamid G. Kia et al., U.S. patent application Ser. No. 12/886,632, entitled "Fiber-Wrapped, Magnesium Tubular Structural Components," filed Sep. 21, 2010, incorporated herein in its entirety by reference, wrapping such a tube with a reinforcement allows the tube to absorb a greater amount of compressive force before failure by keeping broken tube fragments aligned to continue to absorb force. The grooved or segmented magnesium alloy tubes now disclosed shatter segment by segment or sequentially end-to-groove and groove-to-groove, providing an overall increase in ability to absorb energy as compressive load as compared to magnesium alloy tube of similar length and shape and that is similarly wrapped about its perimeter with a fiber along its longitudinal axis but that is not grooved or segmented.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As used in this specification, the term "or" includes any and all combinations of one or more of the associated listed items. When the terms first, second, third, etc. are used to differentiate various elements, components, regions, layers, and so on from each other, these designations are merely for convenience and do not limit the items.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings illustrate selected embodiments but not all possible implementations or variations described in this disclosure.

Corresponding reference numerals indicate corresponding parts throughout the several views of the drawings.

DETAILED DESCRIPTION

Figure 1:
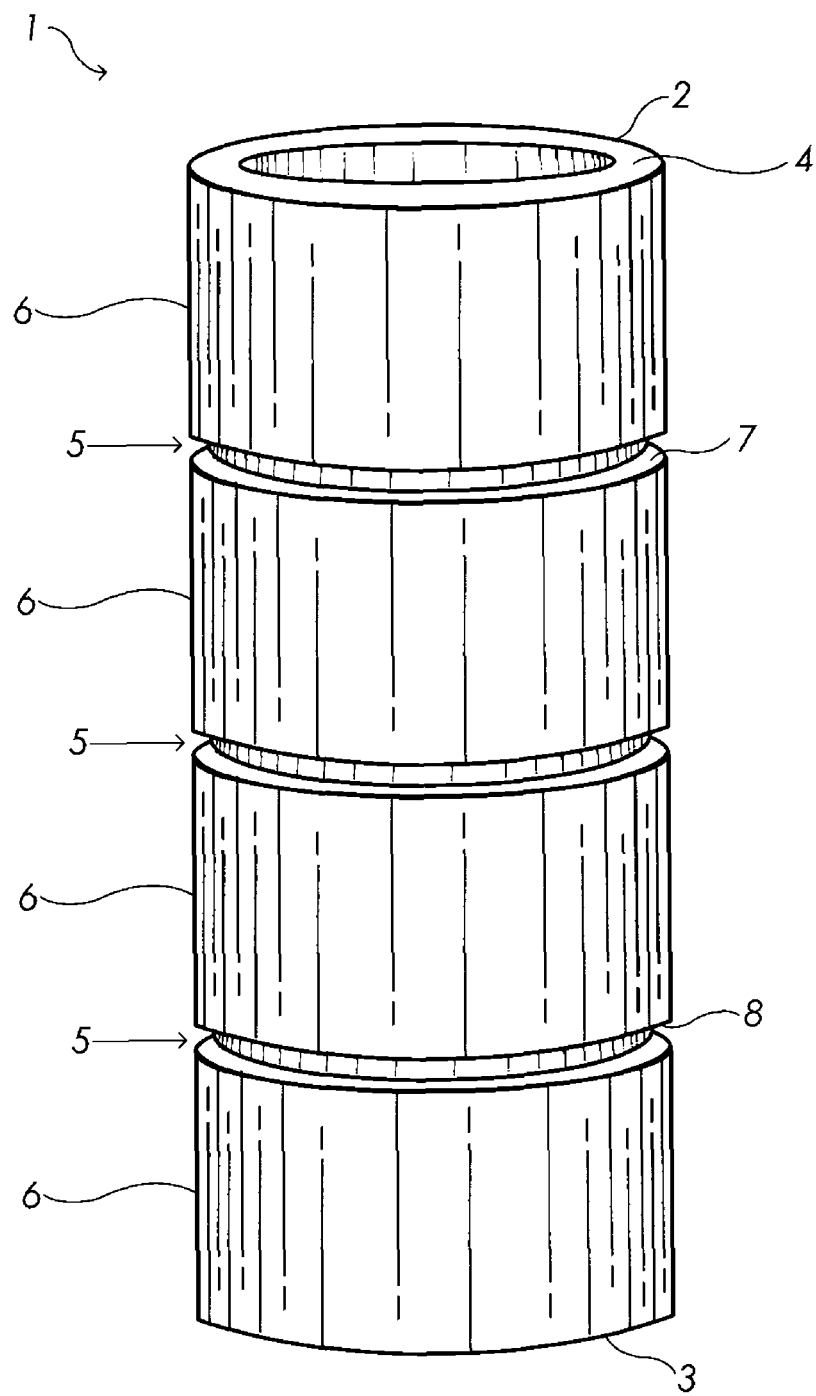
FIG. 1 is a perspective view of a magnesium alloy tube having spaced grooves.

A detailed description of exemplary, nonlimiting embodiments follows.

The tube may be constructed of any magnesium alloy of sufficient strength to absorb compressive force to a desired extent, to support a desired load, and to meet any other requirements for a structural member such as stiffness, durability, and corrosion resistance. The major alloying elements used with magnesium are lithium, aluminum, silicon, calcium, manganese, copper, zinc, strontium, yttrium, zirconium, silver, and the rare earth elements. The magnesium alloy used in forming the tube or tube segments is chosen based on a desired forming method and for the use to which the tube is to be put. Methods for forming magnesium alloys include casting by various methods such a high pressure die casting, low pressure permanent mold and sand casting, gravity permanent mold and sand casting, plaster/investment casting, and squeeze- and thixocasting. Magnesium alloys used for casting include AZ63, AZ81, AZ91, AM20, AM50, AM60, AS21, AS41, AE42, ZK51, ZK61, ZE41, ZC63, HK31, HZ32, EZ33, EK31, EQ21, QE22, QH21, WE54, WE43, and Elektron® 21 (composition given as 0.2-0.5% Zn, 2.6-3.1% Nd, 1.0-1.7% Gd, saturated Zr, balance Mg). Magnesium alloys may also be extruded. Magnesium alloys used for extrusion include AZ31, AZ61, AZ80, ZK60, ZK30, WE43, M1A, HK31, HM21, ZE41, ZC71, and Elektron® 675.

The magnesium tubes may be formed by one of these methods for forming magnesium alloys as separate segments, with the separate segments then being kept adjacent by the wrapped or jacketing reinforcement or joined mechanically or with an adhesive. Alternative, the magnesium tubes may be formed in a single piece and subsequently grooved or cut into separate segments. If cut into separate segments, the separate segments may then be joined, for example, by an adhesive, welding including friction welding or friction stir welding, or mechanically joined. Nonlimiting examples of suitable adhesives include epoxy, epoxy-phenolic, polyurethane, silicone, cyanoacrylate, polyvinyl acetate, vinyl chloride-vinyl acetate copolymer, vinyl-phenolic, nitrile-phenolic, neoprene-phenolic, and nylon-epoxy adhesives. Water-based adhesives are not preferred because they may potentially cause corrosion. Non-limiting examples of suitable mechanical joints include friction fit and threaded joints.

The magnesium tubes or sections may be formed with a variety of cross-sections and lengths for receiving a compressive load along the axis of the tube. Nonlimiting examples include tubes with circular, elliptical, square, rectangular or other polygonal cross-sectional outer perimeter shapes with uniform or nonuniform wall thicknesses. Other tubes may have truncated geometrical or frustum shapes with a broad range of cross-sections, including conical and pyramidal shapes. A conical tube for use as a compression member may have suitably steep sides for absorbing the compressive force along the vertical axis of the tube. The magnesium alloy tube structures may generally be described as having two ends spaced on a substantially straight axis, and designed to be subjected to a compressive force applied against one end of the tube and transmitted toward the other end.

In various embodiments a groove is or a plurality of grooves may be cut into a magnesium alloy tube around its perimeter at a point or points between the ends of the tube. Such a groove may have a depth of from about 10% to about 90% of the wall thickness of the tube as measured for the wall adjacent the groove. The width of the grooves is not critical; in general, the grooves may be from about 1 mm or wider. The grooves may be rounded, v-shaped, have sides at 90° angles (i.e., square-cut) or be of other geometries; the grooves may be of any geometry to facilitate design or manufacture. The number of grooves cut into a magnesium alloy tube is selected based on such factors as tube length and thickness, the compressive force to be absorbed by the tube, and the load to be supported by the tube. In various embodiments, the grooves may be substantially evenly spaced, or the spacing of the grooves may vary depending upon design requirements.

The number and geometry of the grooves can vary widely. As an example, a magnesium alloy tube may have three to about eight, or three to seven, or four to seven grooves around its perimeter. The grooves can be spaced to allow a predetermined compressive stress before breakage of a segment of the elongated, walled magnesium alloy structure between an end receiving the compressive force and a closest groove to the end.

FIG. 1 shows a cylindrical, extruded AZ31 magnesium alloy tube 1 having a first end 2 and second end 3. Magnesium alloy tube 1 is about 150 millimeters in length. Magnesium alloy tube 1 has three grooves 5 around its perimeter in planes parallel to ends 2,3. As an example, ends 2 and 3 lie in substantially parallel planes and are circular with an outer diameter of 52 millimeters and an inner diameter of 46 millimeters, so that the thickness of wall 4 is uniformly about 3 millimeters except where grooves 5 are cut into the wall 4. The grooves define four segments 6. The three grooves 5 are equally spaced along the long axis of magnesium alloy tube 1.

Each groove has a bottom edge 7 and top edge 8, each lying in a plane parallel to the planes of ends 2, 3. Each groove has a depth of 0.5 mm into the wall 4 (i.e., width of groove edges 7,8) and a height of 2 millimeters between adjacent segments 6.

The groove or grooves may be filled with a polymeric materials, particularly curable polymeric materials, and more particularly curable polymeric composite materials filled with particulate filler or chopped fibers for increased strength. Such materials are well-known and include, as nonlimiting examples, particulate fillers such as calcium carbonate, dolomite, talc, or magnesium hydroxide or chopped fibers such as glass or aramide fibers in a thermoset matrix such as a thermoset epoxy, polyester, polyvinyl ester, phenolic, or polyimide matrix. The curable composite materials may be cured before the magnesium alloy tube is covered with the reinforcement or, particularly when the reinforcement is impregnated with a curable resin composition of similar curing temperature, after the magnesium alloy tube is covered with the reinforcement so that the curable material filling the groove or grooves and the curable resin impregnated into the reinforcement are cured together.

Figure 2:
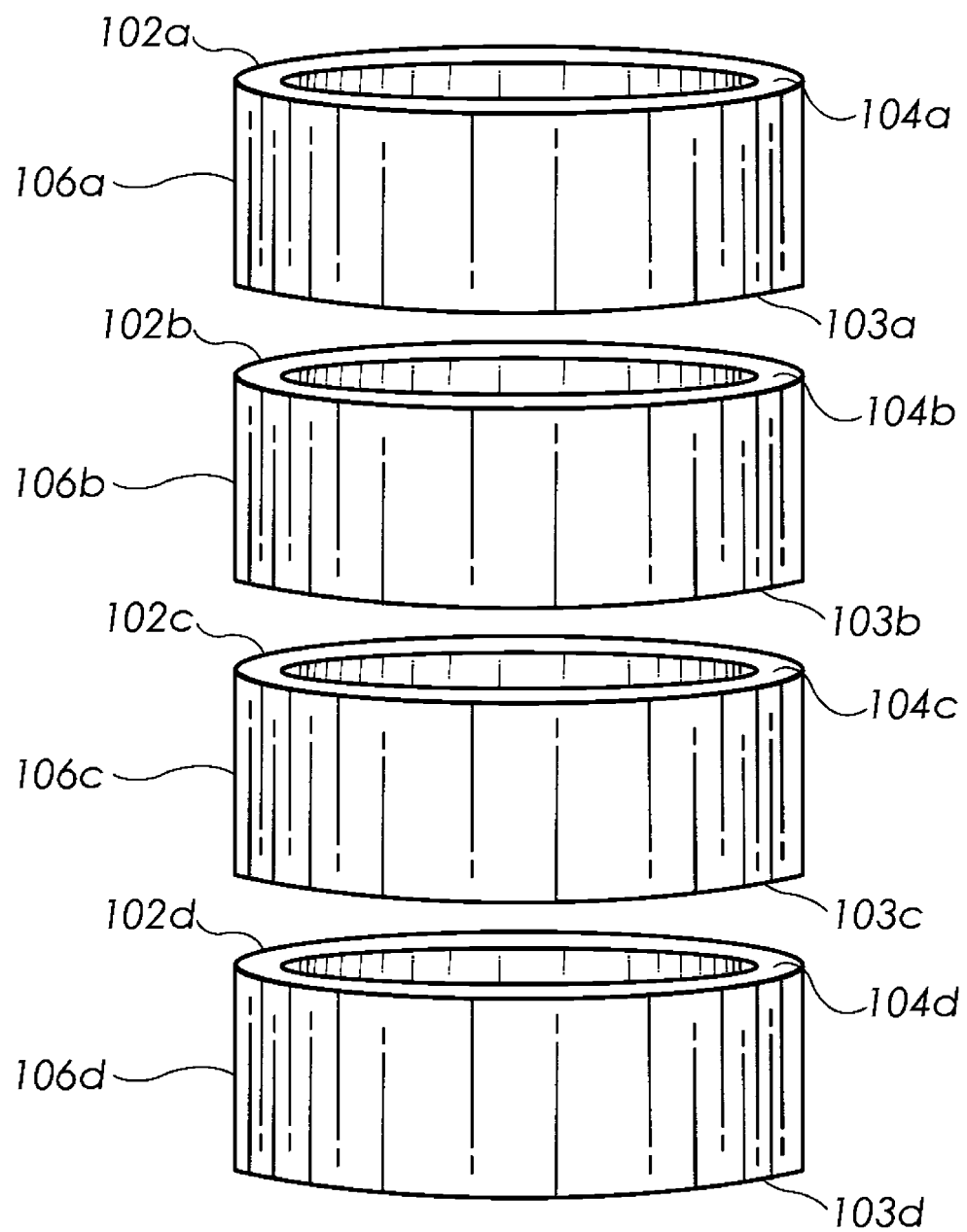
FIG. 2 is a perspective view of four individual ring-shaped, walled segments of magnesium alloy.

FIG. 2 shows four identical rings 106a, 106b, 106c, and 106d of magnesium alloy. The rings 106a-d may be molded individually or a longer tube having the same cross-section may be molded or extruded from magnesium alloy and then cut into rings 106a-d. Each ring has ends 102, 103 and has a wall 104: ring 106a has ends 102a, 103a and wall 104a; ring 106b has ends 102b, 103b and wall 104b; ring 106c has ends 102c, 103c and wall 104c; ring 106d has ends 102d, 103d and wall 104d. Each of walls 104a-d has a same outer diameter, inner diameter, and thickness.

Individual segments are stacked adjacent and, preferably, joined by an adhesive applied between each pair of surfaces 103a-102b, 103b-102c, and 103c-102d. In other examples, the ends of adjacent segments may be welded, e.g. by friction welding. In assembling the tube from individual segments, the individual segments may be aligned by various methods, for example by being placed on a mandrel or by fixturing of the tube exterior.

The segments may also be stacked and have a polymeric material foamed in the interior space of the stacked sections, preferably after the joining the sections. Nonlimiting examples of polymeric foams include polystyrene and polyurethane foams.

The grooved magnesium alloy tube or individual segments of a segmented tube may have interior ribs or struts of the magnesium alloy for resisting inward deformation of the tube during a compressive load. Such interior reinforcing members will typically be straight, extend through the axis of the tube or individual segment, and with opposing ends fixed to the interior surface of the tube or segment. The interior reinforcing members may extend the full length of the grooved tube or be formed in selected longitudinal regions of the grooved tube, or may be in all or less than all of the individual segments. The struts of individual segments may or may not be aligned with those of other individual segments.

The segmented magnesium alloy tube is wrapped or jacketed around its external surface, generally for its whole length from end to end, with a reinforcement such as thermoplastic polymer film, metal wire or mesh, or a fiber reinforcement. The wrapped reinforcement serves to support a compression loaded magnesium tube against fragmentation or other failure of the tubular structure. When the metal or fiber may react with the magnesium alloy, e.g. to cause galvanic corrosion, it may be separated from the metal alloy by the alloy being clad or coated with a polymeric coating or other nonmetallic coating by the segmented magnesium alloy tube being coating or covered with a plastic or other nonmetallic sleeve. Examples of suitable coatings are thermoset epoxy coatings; examples of suitable plastic layers are polyurethane film, and a foamed polystyrene sleeve. In addition or alternatively, the metal or metal-containing reinforcement may have a polymeric cladding or coating.

Fiber reinforcements may be in the form of yarns, tows, rovings, braids, tapes, mats, or fabrics that may be woven, knit, needled, braided, or stitched. Glass fibers are often preferred because they are strong, relatively inexpensive, available in many forms, and do not tend to corrode the magnesium tube in most working environments. Tows, rovings, yarns, or tapes may be wound around the tube. The wrappings may be patterned, for example, in a helix, overlapping loops, or crisscross pattern of fibers crossing at various angles. The wrapping is to reinforce the full length of the tube. However, continuous fiber wrappings may be applied in circumferential bands spaced along the length of the tube. Many fibers, such as glass fibers, are available in braids, mats, felts, or cloths that may be wrapped around the outer surface of the tube to support the tube under compressive loads. The fiber wraps are fixed to the tube surface. The ends of many fiber materials may be fused or otherwise simply attached to the outer surface of the magnesium tube to suitably anchor the fiber wrapping for its intended supportive role.

In various embodiments, nonmetal reinforcements may be impregnated with the thermoset composition, such as a thermoset epoxy resin mixture, that is cured once the reinforcement is in place around the perimeter of the magnesium alloy tube. The fiber reinforcement may be covered or impregnated before or after being wrapped on the tube with a thermosettable resin that is cured after wrapping, for example by resin transfer molding. Suitable, nonlimiting examples of thermoset systems that may be used are epoxies, polyesters, polyvinyl esters, phenolics, and polyimides. In some embodiments, a thermoplastic matrix such as polyamide, polyester, polycarbonate, polyacetal, polyamide-imide, polyether-ether ketone, polysufone, polyphenylene sulfide or polyether imide may be used. A reinforcement with a thermoplastic matrix would be heated above the softening or melting point of the matrix polymer to fuse the reinforcement around the magnesium alloy tube. In various embodiments, the fibers lie in planes about 45° to about 90° from the direction of the compressive force to be applied to an end of the magnesium alloy tube or in planes from about parallel to about 45° from a plane of an end of the tube against which the force will be applied.

As a nonlimiting example, the weight of a composite reinforcement wrapped around the circumference or perimeter of the magnesium alloy tube may be from about 10 wt. % to about 20 wt. % or from about 12 wt. % to about 15 wt. % of the wrapped tube. The size of each individual fiber or the diameter of each individual tow or roving is not as important as their combined weight used in wrapping the magnesium alloy tube. As an illustrative example, a glass roving may have a diameter of about 2-3 mm and may be braided into a cloth having pores of about 1-2 mm diameter.

When the segmented magnesium alloy tube with its reinforcement wrap is subjected to compressive force, a first segment between the first end and the first groove absorbs the compressive force until it reaches a point where it cracks and eventually breaks. The first groove or joint between segments prevents cracks in the first segment from propagating into succeeding segments of the tube. The reinforcement wrap holds the broken pieces in alignment for a period of time to absorb more of the compressive force until eventually the force causes the broken pieces and reinforcement wrap in the first segment to collapse and break away from the remaining, unbroken portion of the tube. The compressive force then encounters the remaining portion of the tube where the first segment pieces have broken away at the first groove into a flat edge parallel to the edge of the original tube end and perpendicular to the compressive force applied.

Figure 3:
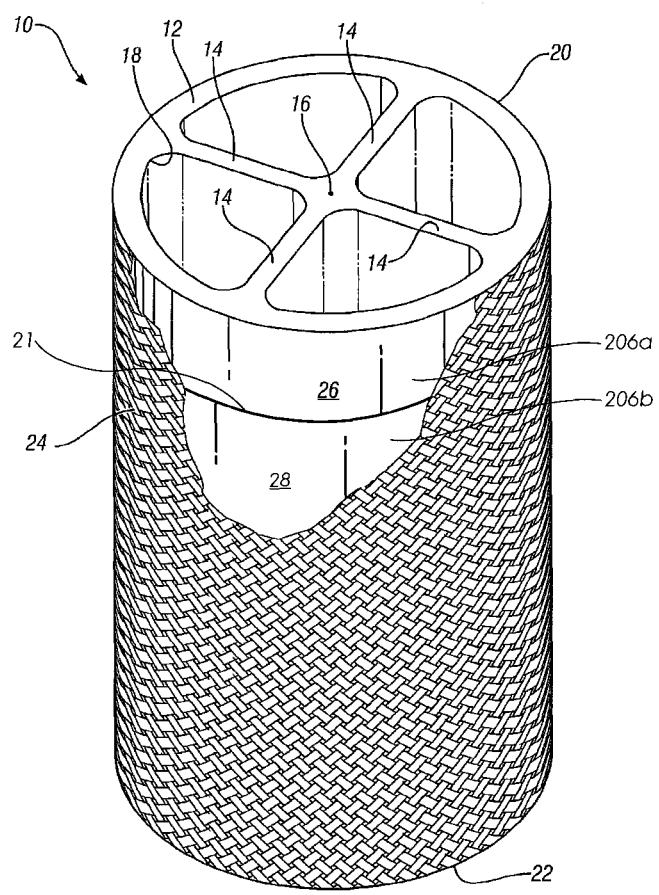
FIG. 3 is an oblique view of a glass fiber braid-wrapped segmented magnesium alloy tube having four interior radial struts.

FIG. 3 illustrates an exemplary cylindrical, segmented tube 10 formed by extrusion of a first tube using an AZ31 magnesium alloy. The extruded first tube has four radial interior reinforcing struts 14, spaced at 90° of arc. The extruded first tube is cut into four equal segments, then the segments are joined with an adhesive to form segmented tube 10. Seam or joint 21 is formed where segments 206a and 206b are joined by the adhesive. Segmented AZ31 magnesium alloy tube 10 is useful as one of two (or more) crash can members for attachment at one of their tube ends to the front end of a vehicle body structure and for carrying a bumper structure attached to their opposite tube ends. Magnesium alloy struts (or crash cans) of this type are lighter in weight than other metal struts and may be used, for example, to carry relatively light weight bumper structures formed of energy absorbing polymer and polymer composite materials.

Tube 10 has four interior radial struts 14 (or two diametrical struts), spaced at 90°, and that extend from the center 16 of tube 10 to the inside surface 18 of each of segments 206a, 206b, and two additional segments of the tube 10 not visible in the figure. Each of struts 14 extends like a rib or wall along the full length of each segment of the tube 10. The radial struts 14 are intended to provide reinforcing strength to the tube segment, including support to resist interior collapse of each segment when a compressive load is applied between tube ends 20, 22 and along the longitudinal axis of the tube, passing through tube center 16. The radial struts 14 of each individual segment need not line up with those of an adjacent segment. The assembled segmented tube 10 has an outer diameter of 52 mm; a length of 150 mm; and wall 12 thickness of 3 mm.

Figure 4:
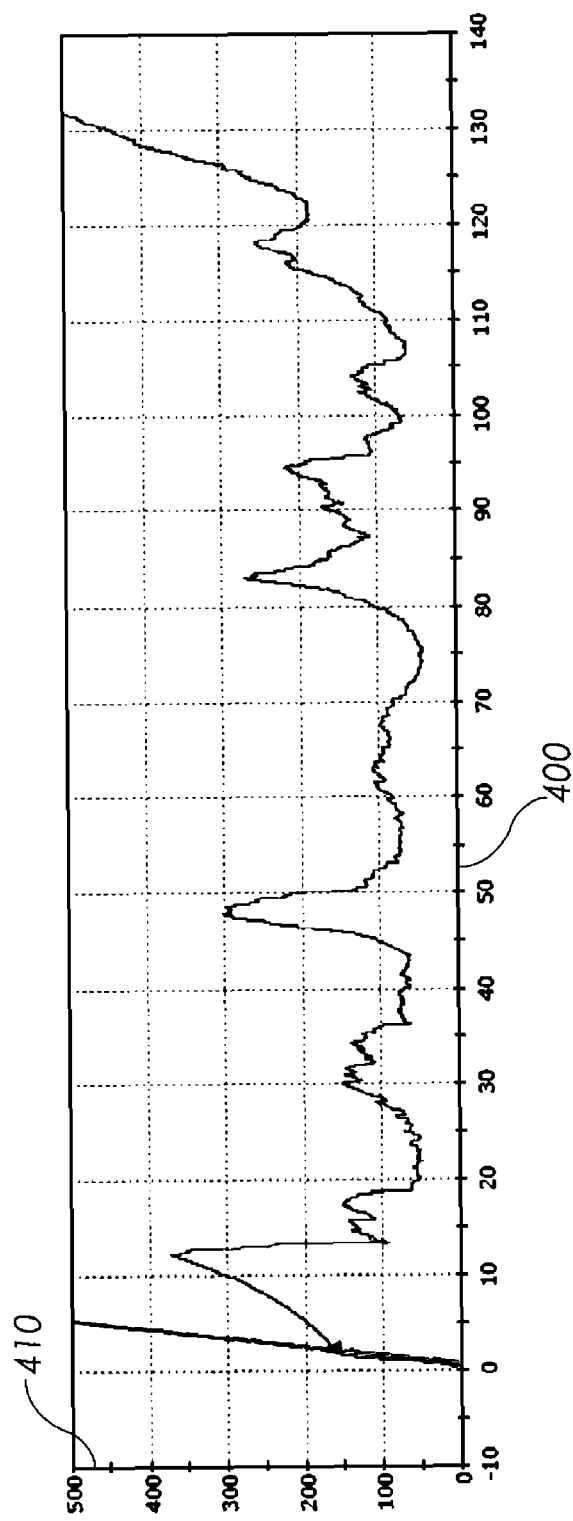
FIG. 4 is a graph of compressive stress, in MPa, versus compressive extension, in mm, for a magnesium alloy tube having grooves as shown in FIG. 1 but also including four interior radial struts as illustrated for the tube in FIG. 4, also wrapped with a cured, resin-impregnated glass fiber braid.

Tube 10 in FIG. 4 has a braid 24 of strands of fiberglass rovings stretched into engagement with the external surfaces of the segments of tube 10. External surfaces 26, 28 of the first two segments are visible; two more segments are hidden by braid 24. Glass fiber braid 24 is impregnated with epoxy resin and the resin is cured to bond braid 24 to the segment surfaces. This resin bonded, glass fiber braided wrap provides reinforcement to segmented tube 10, especially, but not solely, when the tube is subjected to an end-to-end compressive load. The epoxy resin bonded, glass fiber braid 24 was applied to segmented tube 10 as follows. The segmented, magnesium alloy tube 10 was cleaned with acetone, then a fiberglass round braid 24 from A&P Technology (#Z24L300R, nominal 3" diameter, 18 oz/yd$^2$) was cut to a length of 19" (mass of 54.5 g). The fiberglass braid 24 was pulled over the outer surface of the segmented magnesium tube and then tensioned longitudinally to pull the braid snug to the tube. The braid was taped to the magnesium tube at the ends of the tube to maintain the tensioning on the glass fibers. Based on the mass of the fiberglass braid, the desired mass of resin was 27.3 g (approximately ½ of the mass of the fiberglass braid). An excess of epoxy resin was needed to allow for some resin to flow past the end of the braided section and into the bleeder cloth.

Forty grams of a thermoset epoxy resin was mixed at room temperature. The formulation of the resin was based on a 100 parts epoxy resin (Dow 383), 80 parts anhydride curing agent (MTHPA 600 from Lonza), and 2 parts of a catalyst (BDMA from Aldrich). The resin was hand mixed and degassed for 10 minutes. The glass fiber braid-wrapped segmented tube was placed on a sheet of release film and the epoxy resin was poured and hand spread over the central two thirds of the overwrapped fiberglass braid. Bleeder cloth was taped to the ends of the braid. The segmented tube with its over-braid layer was then wrapped with the release film, then bleeder cloth, and finally an outer layer of a vacuum bagging film. After sealing the bag, a vacuum was applied and the whole bagged segmented tube was placed into an oven at 80° C. The segmented tube was left in the oven for approximately 3 hours to cure. After the epoxy resin was cured the protective bag was removed. The ends of the tube where the braid was taped were cut off and discarded.

The prepared fiber wrapped, segmented magnesium alloy tube was then subjected to a compression loading test. The fiber wrapped, segmented tube was placed standing vertically on one end on a supporting surface and a compressive load was applied to the upper end. The loading was applied evenly over the round upper end of the tube and directly along the vertical central axis of the up-standing tube. The compressive load was programmed and applied so as to increase and deform the tube downwardly at a rate of one millimeter per second. The data from the test is shown in the graph in FIG. 4. The graph in FIG. 4 has an x-axis 400 in units of compressive extension in millimeters (mm) and a y-axis 410 in units of compressive stress in megapascals (MPa). The curve in FIG. 4 shows a series of peaks corresponding to discontinuities (joints) in the tube.

Figure 5:
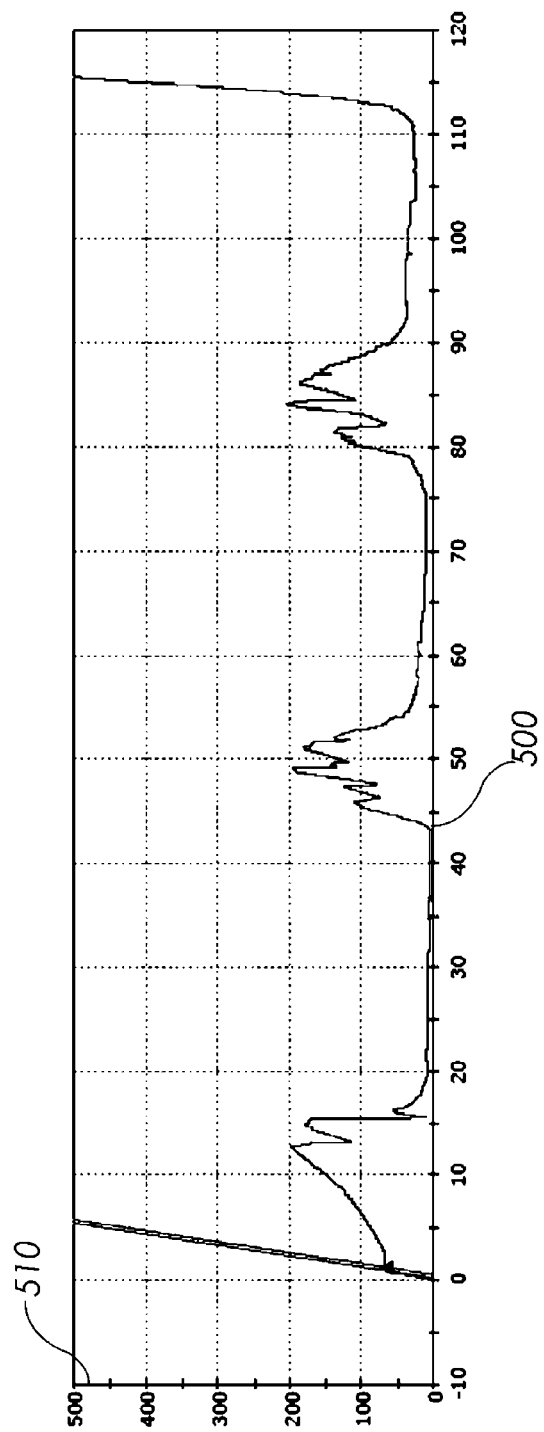
FIG. 5 is a graph of compressive stress, in MPa, versus compressive extension, in mm, for the magnesium alloy tube as illustrated in FIG. 4.

In a second illustrative example, a tube with four radial interior reinforcing struts spaced at 90° of arc is extruded using an AZ31 magnesium alloy as described for the example shown in FIG. 3. Instead of being cut into individual segments as it was for the tube in FIG. 3, the extruded, reinforced tube is grooved with three grooves as shown in FIG. 1. Each groove is parallel to the ends of the tube and has a height of 2 mm and depth of 0.5 mm. The grooved tube is wrapped with a braid, coated with a thermosetting epoxy mixture, and cured in the manner described for the tube shown in FIG. 3. The prepared fiber wrapped, grooved magnesium alloy tube was then subjected to a compression loading test as previously described for the tube of FIG. 3. The data from the test is shown in the graph in FIG. 5. The graph in FIG. 5 has an x-axis 500 in units of compressive extension in millimeters (mm) and a y-axis 510 in units of compressive stress in megapascals (MPa). The curve in FIG. 5 shows a series of peaks corresponding to a discontinuities (grooves) in the tube.

In still another embodiment, individual segments are cast or machined with terminal end indentations of the thickness of the magnesium alloy perimeter wall to fit inside a next successive segment in making the magnesium alloy tube. A final segment may be of the same shape, that is, it may also have a terminal end indent, or it may be made with no indent. The fit may be a friction fit or the interlocking segments may be secured using welding or mechanical joining techniques. In still another embodiment, when the segments have circular cross-sectional ends, the indented terminal end may be threaded on its exterior surface and the upper end of a next succeeding segment may have complementary threading on its interior to permit the segments to be screwed together. The segment indented terminal end inserted into the succeeding segment may be wrapped with PTFE tape or fitted with a gasket to provide a tighter fit.

Figure 6:
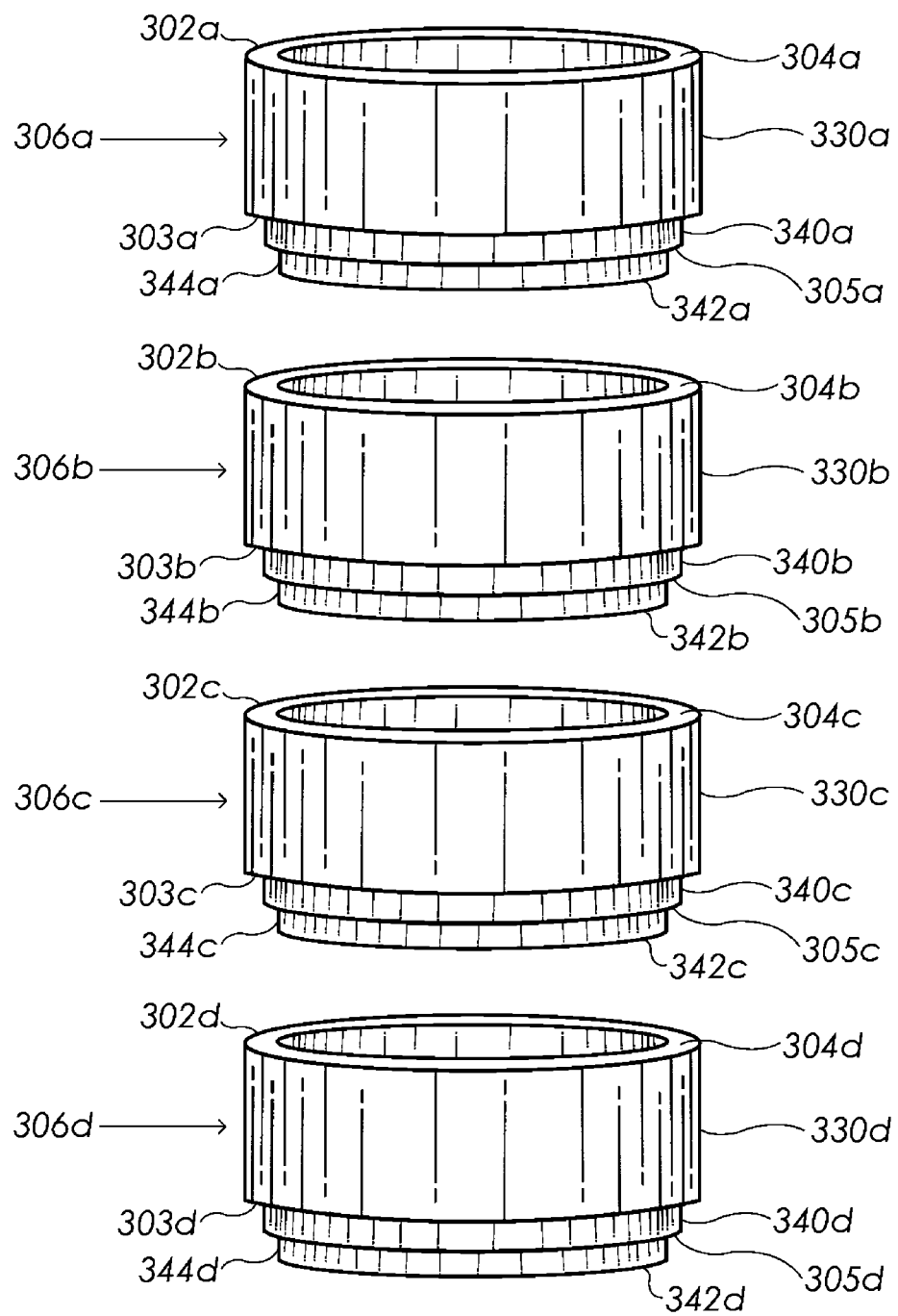
FIG. 6 is a perspective view of four walled, ring-shaped segments of magnesium alloy that fit one into the next in making a tube with the segments.

FIG. 6 illustrates tube segments having as self-aligning features in the tube shape indented terminal sections. Segments 306a-d are individually made with straight-sided portions 330a-d between ends 302a-d, having walls 304a-d, and edges 303a-d and with indented straight-sided portions 340a-d between edges 303a-d and 305a-d and further indented straight-sided portions 344a-d between edges 305a-d and ends 342a-d. In this example, the sides of portions 330a-d, 340a-d, and 344a-d are parallel to one another and perpendicular to ends 302a-d, 303a-d, 305a-d, and 342a-d, and ends 302a-d, 303a-d, 305a-d, and 342a-d are parallel to each other. The outer circumferences of portions 344a-c are slightly less than the inner circumferences of walls 304b-d at ends 302a-d so that portions 344a-c may be friction fit, optionally wrapped with PTFE or other tape to ensure a firm fit, into the openings formed by walls 304b-d at ends 302a-d. If desired, an adhesive may be applied to ends 342a-c or inner, receiving surfaces of portions 330b-d where portions 344a-c are fit into the upper openings of walls 304b-d of ends 302b-d. If desired, outer surfaces of 344a-c and inner, receiving surfaces of portions 330b-d could be threaded for screwing adjacent segments together. After portions 344a-c are fit into portions 330b-d, straight-sided portions 340a-c will define a groove between consecutive portions 330a-d.

Fiber wrapped, segmented magnesium tubes will find many useful applications, where relatively light-weight structural members are needed to sustain compressive loads, especially sudden compressive loads. In automotive vehicles, for example, such magnesium tubes may be used to attach bumpers to vehicle body members where the tubes are intended to absorb crash impacts. In fact, such tubes are sometimes called "crash cans." Fiber wrapped magnesium tubes make lighter weight crash cans than the heavier metals now required. Also, fiber wrapped magnesium tubes may be used as other vehicle body or chassis members that are shaped and located to receive sudden crash impacts, or the like.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A tube formed of a magnesium-based alloy and having a length and longitudinal axis, an internal tube surface and a complementary external tube surface spaced from the internal surface to define a tube wall, and opposing end surfaces spaced along the longitudinal axis of the tube;

the tube being sized and shaped to serve as a structural member for receiving a compressive stress applied to an end of the tube and acting along the axis of the tube toward the opposing end of the tube; and the tube being wrapped or jacketed with a reinforcement to apply a restraining force on the external surface of the tube for resisting fragmentation of the tube by the compressive force applied to the end of the tube;

wherein the tube is divided into segments along the longitudinal axis.

2. The tube according to claim 1, wherein the tube has a frustum shape or non-uniform wall thickness.

3. The tube according to claim 1, wherein the tube is configured to provide an increasing amount of compressive stress with each succeeding segment.

4. The tube according to claim 1, wherein the tube is divided into the segments by one or more grooves in a perimeter of the tube wall.

5. The tube according to claim 4, wherein at least one groove is filled with a polymeric material.

6. The tube according to claim 1, wherein the segments are adjacent or mechanically or adhesively joined.

7. The tube according to claim 1, wherein the tube is wrapped or jacketed with a fiber reinforcement.

8. The tube according to claim 7, wherein the fiber reinforcement is coated or impregnated with a cured thermoset resin composition.

9. The tube according to claim 1, wherein the tube is wrapped or jacketed with a thermoplastic polymer film.

10. The tube according to claim 1, wherein the tube is wrapped or jacketed with metal reinforcement selected from wire and mesh or with a carbon fiber reinforcement, wherein at least one of the tube or the reinforcement is clad or coated to prevent direct contact between the metal reinforcement or the carbon fiber reinforcement and the magnesium alloy.

11. The tube according to claim 1, wherein the tube is interiorly reinforced.

12. The tube according to claim 11, wherein the tube is interiorly reinforced with a foam.

13. The tube according to claim 11, wherein the tube is interiorly reinforced in each segment.

14. The tube according to claim 1, wherein the tube is wrapped or jacketed with a glass fiber reinforcement coated or impregnated with a cured thermoset resin composition.

15. The tube according to claim 14, wherein the glass fiber reinforcement is a mat or fabric.

16. The tube according to claim 14, wherein the glass fiber reinforcement comprises continuous glass fibers wrapped to form a series of spaced bands of fibers on the external surface of the tube, the fibers being wrapped around the axis of the tube such that the bands lie generally parallel to the ends of the tube.

17. An automotive vehicle comprising a tube according to claim 1.

18. The automotive vehicle according to claim 17, wherein the tube is a structural member selected from the group consisting of bumper beams, frame rails, cross members, crush cans, and instrument panel beams.

19. A method of making an article having a structural member comprising a tube to absorb a compressive force, formed from a magnesium-based alloy having a length and longitudinal axis, an internal surface and a complementary external surface spaced from the internal surface to define a tube wall, and opposing end surfaces spaced along the longitudinal axis of the tube, wherein the tube is divided into segments along the longitudinal axis, wrapping or jacketing the tube with a reinforcement to apply a restraining force on the external surface of the tube for resisting fragmentation of the tube by a compressive force applied to an end of the tube;

wherein the structural member comprising the tube is incorporated into the article.

20. The method according to claim 19, wherein the article is an automotive vehicle and the structural member is selected from the group consisting of bumper beams, frame rails, cross members, crush cans, and instrument panel beams.

* * * * *